(12) United States Patent
Smith et al.

(10) Patent No.: US 7,509,810 B2
(45) Date of Patent: Mar. 31, 2009

(54) INTER-TURBINE TEMPERATURE DISPLAY COMPENSATION METHOD

(75) Inventors: Shane R. Smith, Chandler, AZ (US); Tom G. Mulera, Mesa, AZ (US); Tim Belling, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 112 days.

(21) Appl. No.: 11/213,251

(22) Filed: Aug. 26, 2005

(65) Prior Publication Data

US 2007/0006593 A1    Jan. 11, 2007

Related U.S. Application Data

(60) Provisional application No. 60/626,966, filed on Nov. 10, 2004.

(51) Int. Cl.
*F02C 6/00* (2006.01)
*F02C 7/00* (2006.01)

(52) U.S. Cl. .......... 60/772; 60/39.15; 60/803; 340/945

(58) Field of Classification Search .......... 60/39.15, 60/224, 772, 803; 340/945; 374/197; 702/99
See application file for complete search history.

(56) References Cited

U.S. PATENT DOCUMENTS

| | | |
|---|---|---|
| 3,971,208 A | 7/1976 | Schwent |
| 4,032,757 A | 6/1977 | Eccles |
| 4,100,731 A | 7/1978 | Janes et al. |
| 4,220,993 A | 9/1980 | Schloeman |
| 4,644,744 A | 2/1987 | Mittendorf et al. |
| 4,787,053 A | 11/1988 | Moore |
| 5,001,638 A | 3/1991 | Zimmerman et al. |
| 5,165,240 A | 11/1992 | Page et al. |
| 6,285,298 B1 * | 9/2001 | Gordon .................. 340/945 |
| 6,408,259 B1 | 6/2002 | Goebel et al. |
| 6,522,990 B1 | 2/2003 | Rains et al. |
| 6,539,783 B1 | 4/2003 | Adibhatla |
| 6,611,748 B2 | 8/2003 | Greene |
| 6,690,298 B1 | 2/2004 | Barber et al. |
| 6,760,689 B2 | 7/2004 | Follin et al. |
| 2004/0079070 A1 | 4/2004 | Macchia |

FOREIGN PATENT DOCUMENTS

| | | |
|---|---|---|
| EP | 0 322 158 A2 | 6/1989 |
| WO | WO 0135065 A1 | 5/2001 |
| WO | PCT/US2006/024756 | 12/2006 |

OTHER PUBLICATIONS

PCT Search Report.
PCT Search Report Dec. 5, 2006.

* cited by examiner

*Primary Examiner*—Louis J Casaregola
(74) *Attorney, Agent, or Firm*—Ingrassia Fisher & Lorenz, P.C.

(57) ABSTRACT

Control logic, and a method implemented by the control logic, compensates for mismatched inter turbine temperatures between two gas turbine engines and displays a biased inter turbine temperature (ITT) reading to the pilot without jeopardizing the need to be properly informed of the health of all engines and the relationship engine temperature compared to the maximum allowed temperature. A temperature compensation value is added to the lower inter turbine temperature to thereby increase the ITT to a value that is substantially equal to the higher ITT value. As a result, any potential nuisance or distraction that the flight crew may experience from displaying the mismatch is eliminated.

19 Claims, 7 Drawing Sheets

INTER-TURBINE TEMPERATURE DISPLAY COMPENSATION METHOD

CROSS-REFERENCES TO RELATED APPLICATIONS

This application claims the benefit of U.S. Provisional Application No. 60/626,966, filed Nov. 10, 2004.

TECHNICAL FIELD

The present invention relates to inter turbine temperature display and, more particularly, to a system and method of compensating for mismatches between inter turbine temperatures of two or more gas turbine engines.

BACKGROUND

Gas turbine engines, such as multi-spool gas turbine engines, may be used to provide propulsion power for aircraft. In most instances, an aircraft includes two redundant gas turbine engines. The gas turbine engines may be automatically controlled via an engine controller such as, for example, a DEEC (Digital Electronic Engine Controller). The engine controller receives signals from various sensors within the engine, as well as from various pilot-manipulated controls. In response to these signals, the engine controller regulates the operation of the gas turbine engine.

In addition to providing signals for use in the engine controller, various sensors also supply signals that are used to display the sensed parameter. In many aircraft, for example, the low pressure turbine speed or fan speed (N1), the high pressure turbine speed (N2), the fuel flow, the oil pressure, and the inter turbine temperature of each engine may be displayed. It is common to display like parameters for each engine together or adjacent to provide the flight crew with a visual means of comparing the operations of the two engines. For example, the inter turbine temperatures of each engine are typically displayed together or adjacent.

Although the simultaneous display of like engine parameters provides various advantages, it can also exhibit certain drawbacks. For in example, because N1 speeds are typically matched, the inter turbine temperatures may be slightly mismatched. Such mismatches may not be indicative of any type of anomaly. Indeed, on many aircraft such mismatches may occur during normal engine operations. Nonetheless, to the flight crew personnel the slight inter turbine temperature mismatches may be a nuisance and an unnecessary distraction.

Hence, there is a need for a system and method of safely and unobtrusively compensating for mismatched inter turbine temperatures between two gas turbine engines that alleviates the potential nuisance and/or distraction to the flight crew that may result from the display of the mismatch. The present invention addresses at least this need.

BRIEF SUMMARY

The present invention provides a system and method of safely and unobtrusively compensating for mismatched inter turbine temperatures between two gas turbine engines.

In one embodiment, and by way of example only, a method of compensating mismatched inter turbine temperature of two gas turbine engines, which include a local engine and a cross-engine, for subsequent display thereof includes the step of sensing the inter turbine temperature of each gas turbine engine and supplying sensed inter turbine temperature values representative thereof. A determination is made as to which gas turbine engine has a lower sensed inter turbine temperature value and which has a higher sensed inter turbine temperature value. A temperature compensation value is added to the lower sensed inter turbine temperature value to thereby increase the lower sensed inter turbine temperature value to a compensated inter turbine temperature value that is substantially equal to the higher sensed inter turbine temperature value.

In another exemplary embodiment, inter turbine temperature mismatch compensation control logic includes compensation value determination logic, and temperature compensation logic. The compensation value determination logic is adapted to receive a local engine inter turbine temperature value and a cross-engine inter turbine temperature value, and is operable, in response thereto, to compare the local engine and cross-engine inter turbine temperature values and to determine a temperature compensation value based at least in part on the comparison. The temperature compensation logic is coupled to receive the local engine inter turbine temperature value and the temperature compensation value and is operable, in response thereto, to add the temperature compensation value to the local inter turbine temperature value, to thereby supply a compensated inter turbine temperature value.

Other independent features and advantages of the preferred inter turbine temperature compensation system and method will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description, it is to be appreciated that the described embodiment is not limited to use in conjunction with a particular type of turbine engine. Thus, although the present embodiment is, for convenience of explanation, depicted and described as being implemented in combination with a multi-spool turbofan gas turbine jet engine, it will be appreciated that it can be implemented in various other types of turbines, and in various other systems and environments.

Figure 1:
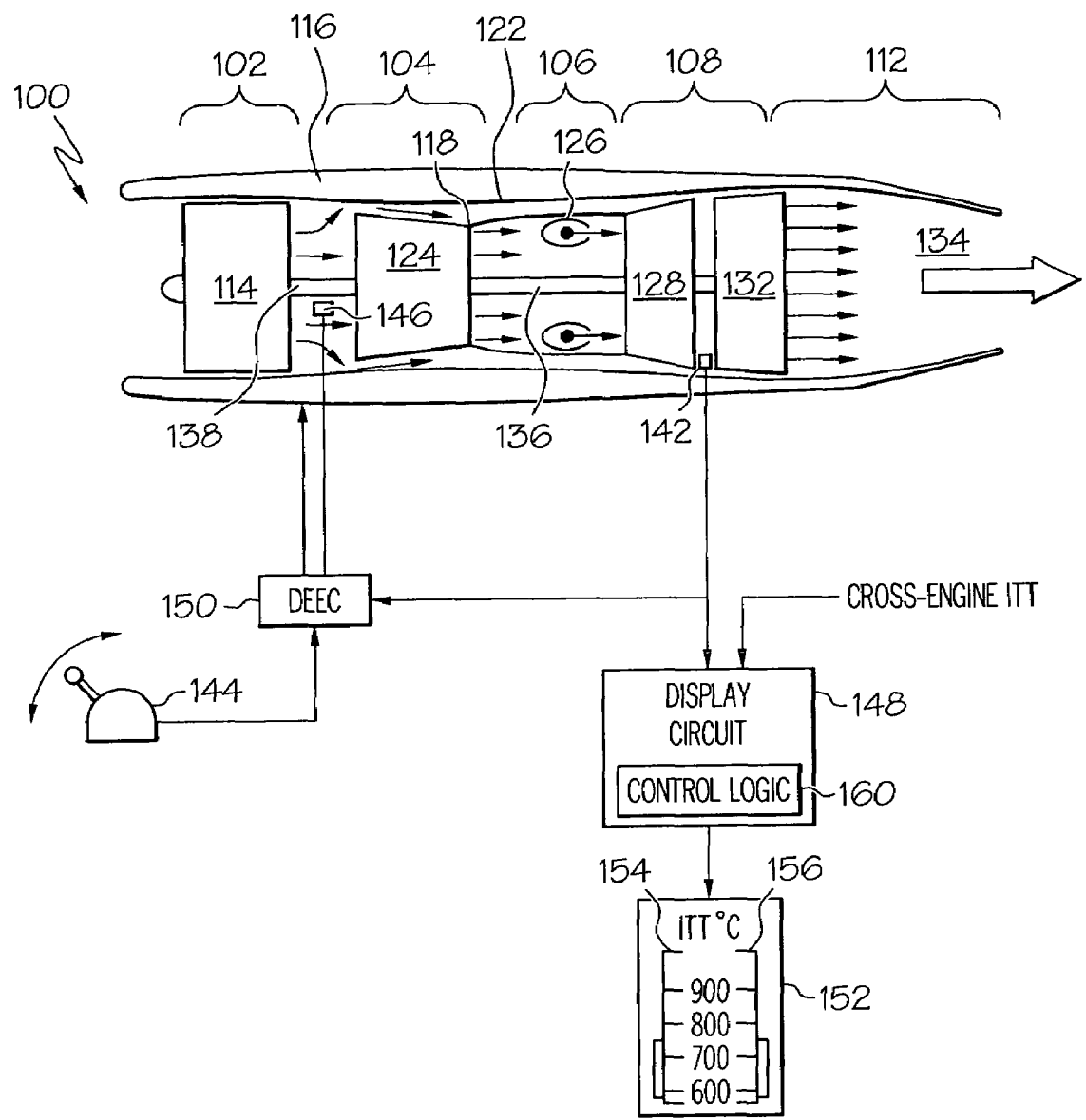
FIG. 1 shows an exemplary multi-spool gas turbine main propulsion engine coupled to an engine controller and display control logic.

Turning now to FIG. 1, an embodiment of an exemplary multi-spool gas turbine main propulsion engine 100 is shown, and includes an intake section 102, a compressor section 104, a combustion section 106, a turbine section 108, and an exhaust section 112. The intake section 102 includes a fan 114, which is mounted in a fan case 116. The fan 114 draws air into the intake section 102 and accelerates it. A fraction of the accelerated air exhausted from the fan 114 is directed through a bypass section 118 disposed between the fan case 116 and an engine cowl 122, and generates propulsion thrust. The remaining fraction of air exhausted from the fan 114 is directed into the compressor section 104.

The compressor section 104 may include one or more compressors 124, which raise the pressure of the air directed into it from the fan 114, and directs the compressed air into the combustion section 106. In the depicted embodiment, only a single compressor 124 is shown, though it will be appreciated that one or more additional compressors could be used. In the combustion section 106, which includes a combustor assembly 126, the compressed air is mixed with fuel supplied from a fuel source (not shown). The fuel/air mixture is combusted, generating high energy combusted gas that is then directed into the turbine section 108.

The turbine section 108 includes one or more turbines. In the depicted embodiment, the turbine section 108 includes two turbines, a high pressure turbine 128, and a low pressure turbine 132. However, it will be appreciated that the propulsion engine 100 could be configured with more or less than this number of turbines. No matter the particular number, the combusted gas from the combustion section 106 expands through each turbine 128, 132, causing it to rotate. The gas is then exhausted through a propulsion nozzle 134 disposed in the exhaust section 112, generating additional propulsion thrust. As the turbines 128, 132 rotate, each drives equipment in the main propulsion engine 100 via concentrically disposed shafts or spools. Specifically, the high pressure turbine 128 drives the compressor 124 via a high pressure spool 136, and the low pressure turbine 132 drives the fan 114 via a low pressure spool 138.

As FIG. 1 additionally shows, the main propulsion engine 100 is controlled, at least partially, by an engine controller 150 such as, for example, a DEEC (Digital Electronic Engine Controller). The engine controller 150 controls the operation of the main propulsion engine 100. More specifically, the engine controller 150 receives signals from various sensors and from various pilot-manipulated controls and, in response to these signals, controls the overall operation of the propulsion engine 100. Included among these signals are an inter turbine temperature (ITT) signal, which is supplied from an inter turbine temperature sensor 142 disposed between the high pressure turbine 128 and the low pressure turbine 132, a power lever angle (PLA) signal, which is supplied from an engine power lever 144 located in the cockpit, and a fan speed (N1) signal, which is supplied from a fan speed sensor 146 in the engine 100.

The inter turbine temperature signal, in addition to being supplied to the engine controller 150, is also supplied to a display circuit 148. The display circuit 148 receives the inter turbine temperature signal supplied not only from the local engine 100, but also from a non-illustrated cross-engine. The display circuit 148, in response to the inter turbine temperature signals, causes an inter turbine temperature display 152 to simultaneously display the inter turbine temperatures of the local engine 154 and the cross-engine 156. The display circuit 148 implements, among other functions, control logic 160 that, except for a few exceptions that are described further below, artificially biases the inter turbine temperature display 152 so that, if the local and cross-engine inter turbine temperatures 154, 156 are slightly mismatched, the temperatures will be displayed substantially equally, without the mismatch.

Figure 2:
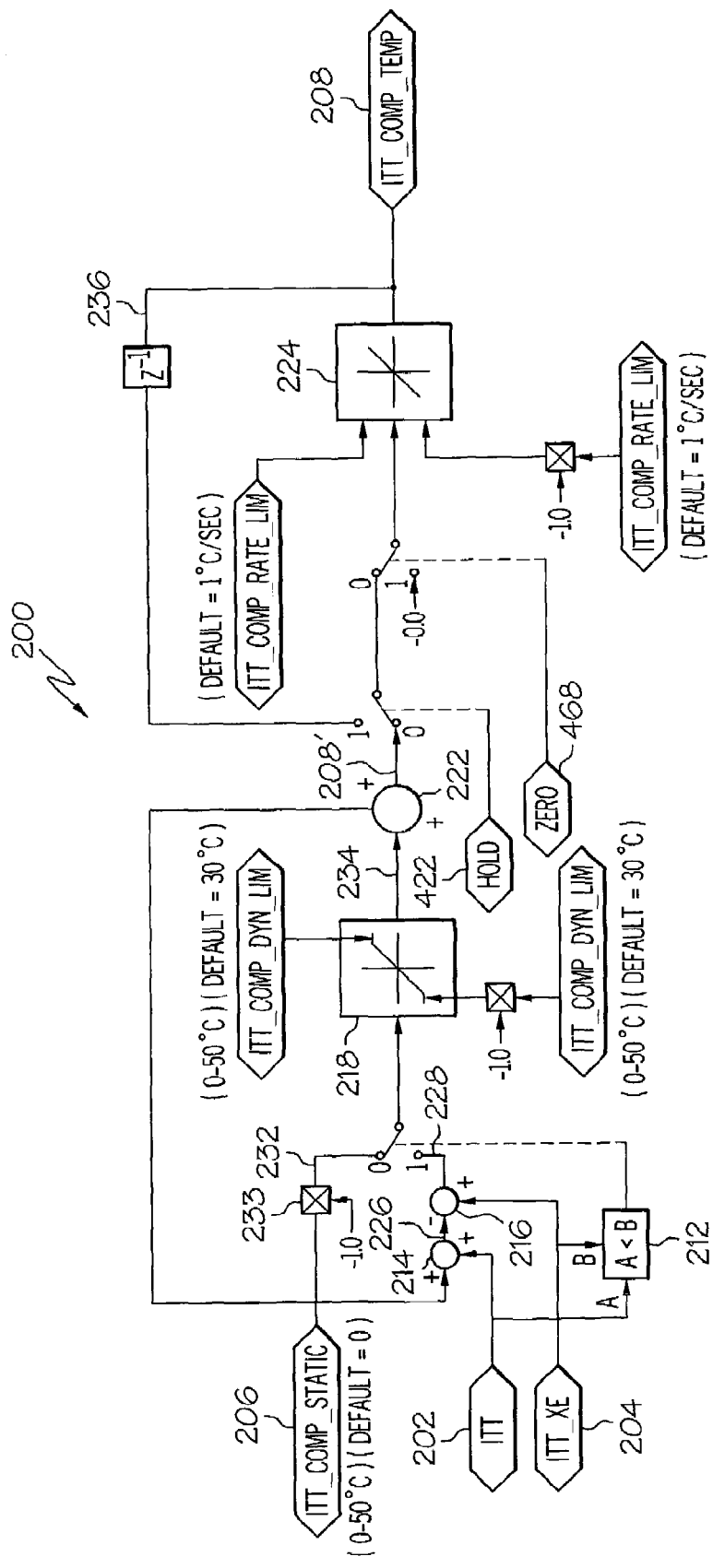
FIGS. 2-4 are simplified functional block diagrams of an embodiment of inter turbine temperature display control logic according to an embodiment of the present invention.
Figure 3:
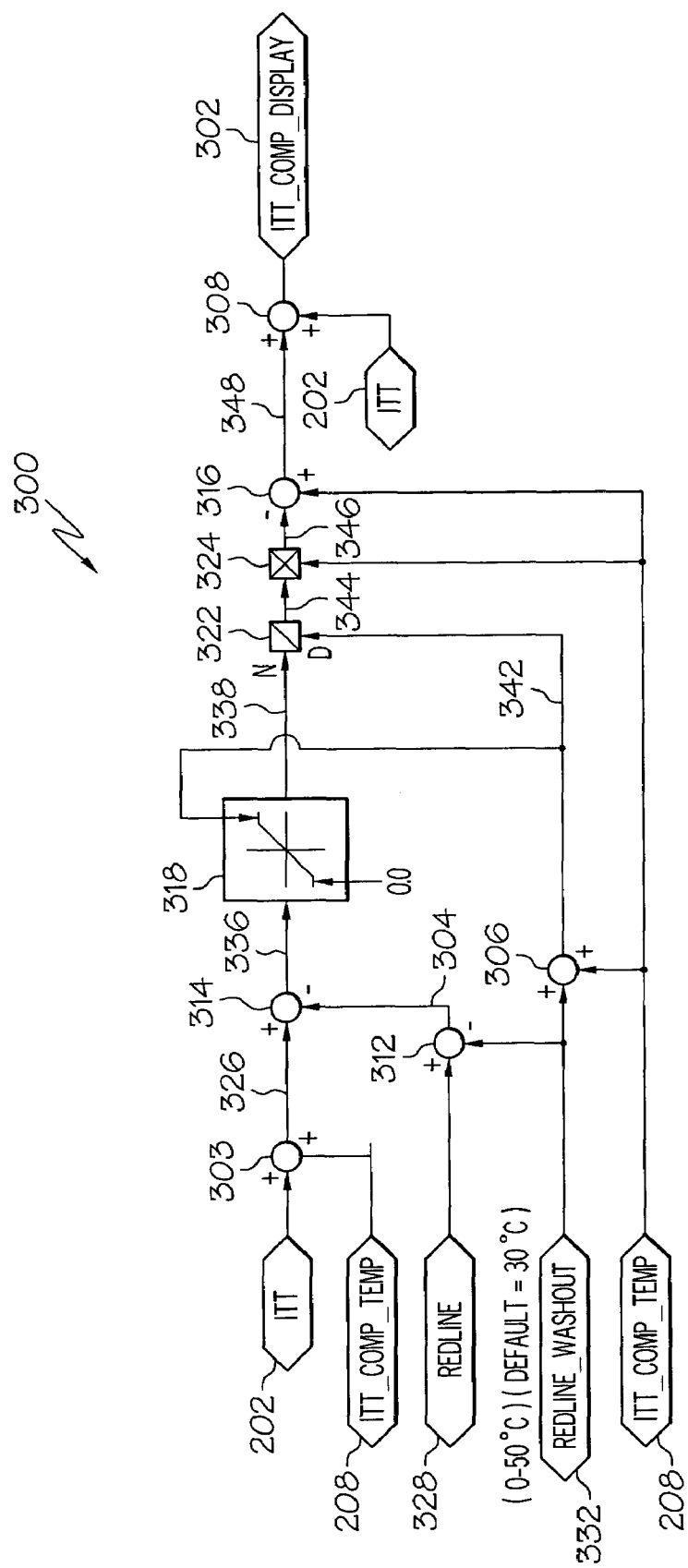
Figure 4:
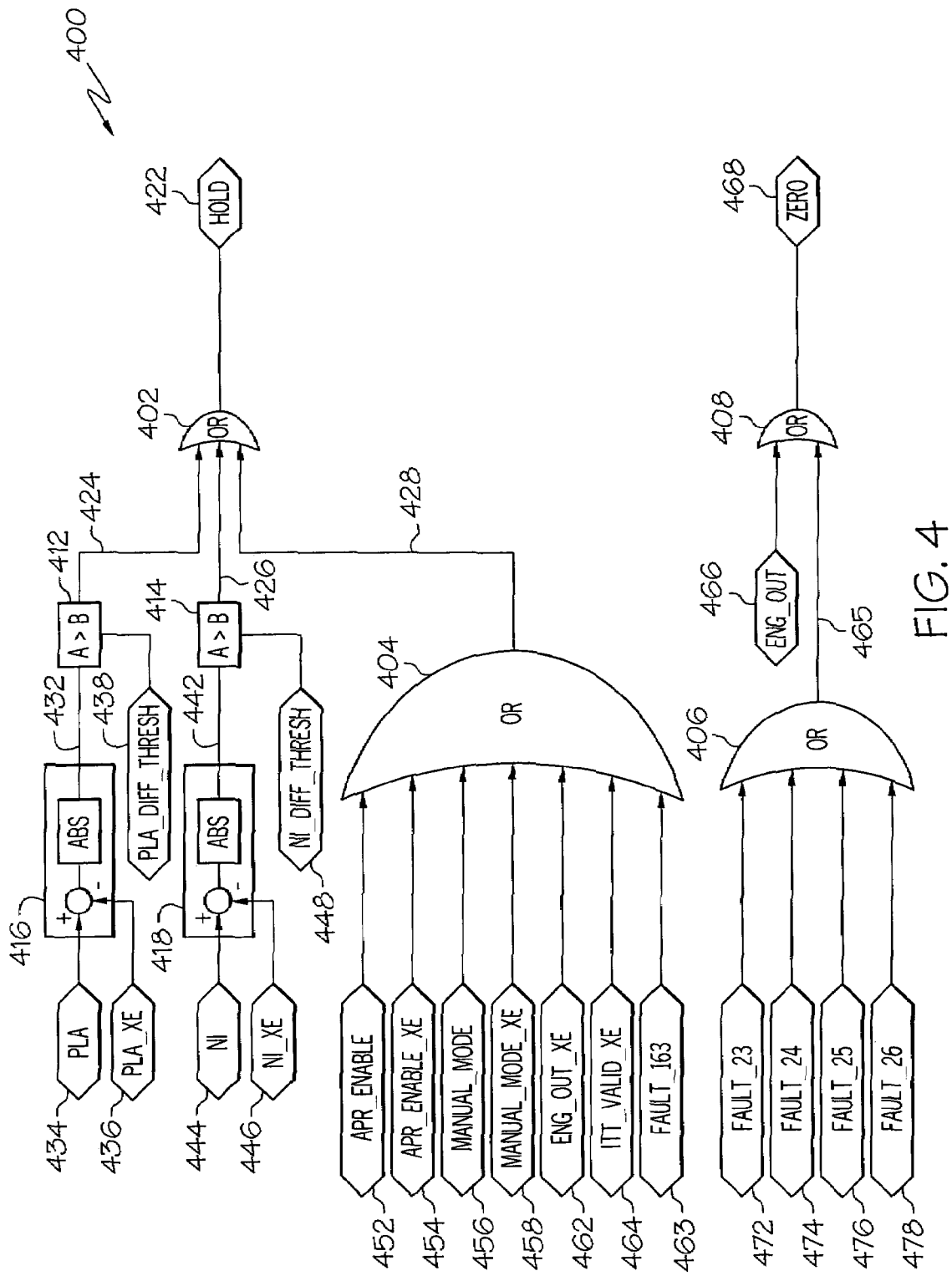

With reference now to FIGS. 2-4, simplified functional block diagrams of an embodiment of the inter turbine temperature display control logic 160 is shown, and will now be described in more detail. Before doing so, however, it is noted that the display control logic 160 is depicted using various schematic symbols that represent physical components. It will be appreciated that this is done for clarity and ease of description, and that the display control logic 160 could be implemented using one or more of these discrete physical components or it could be implemented fully in software or it could be implemented using a combination of hardware and software.

The display control logic 160 associated with each propulsion engine inter turbine temperature sensor 142 includes compensation value determination logic 200 (FIG. 2), temperature compensation logic 300 (FIG. 3), and event determination logic 400 (FIG. 4). The compensation value determination logic 200 receives signals representative of a local engine inter turbine temperature value (ITT) 202 and a cross-engine inter turbine temperature value (ITT_XE) 204. The compensation value determination logic 200 compares the local engine and cross-engine inter turbine temperature values 202, 204 and, based at least in part on the comparison, determines a temperature compensation value (ITT_COMP_TEMP) 208. To do so, the compensation value determination logic 200 includes comparator logic 212, first addition logic 214, subtraction logic 216, limiter logic 218, second addition logic 222, and rate limiter logic 224.

The comparator logic 212 receives and compares the local engine inter turbine temperature value 202 and the cross-engine inter turbine temperature value 204. If the local engine inter turbine temperature value 202 is less than the cross-engine inter turbine temperature value 204, then the comparator logic 212 supplies a logical "1" value, otherwise the comparator 212 supplies a logical "0" value. The first addition logic 214 receives the local engine inter turbine temperature value 202 and a static compensation value (ITT_COMP_STATIC) 206, and supplies a statically compensated inter turbine temperature value 226 that is representative of the mathematical summation of the two values to the subtraction logic 216. The subtraction logic 216 receives the statically compensated inter turbine temperature value 226 and the cross-engine inter turbine temperature value 204, and supplies a dynamically compensated inter turbine temperature value 228 that is representative of the mathematical difference of the two values.

If the output of the comparator logic 212 is a logical "1" value, the dynamically compensated inter turbine temperature value 228 is supplied to the limiter logic 218. Conversely, if the output of the comparator 212 is a logical "1" value, a negated static compensation value 232 is supplied to the limiter logic 218. The negated static compensation value 232 is supplied from multiplier logic 233 that multiplies the static compensation value 206 by a negative one (−1).

The static compensation value 206 is a predetermined value that is set based upon testing, such as installation testing in the aircraft. The static compensation value 206 is preferably stored in non-illustrated memory, such as non-volatile memory, and is available for retrieval therefrom by the compensation value determination logic 200. The static compensation value 206 has a default value of "0" but can be set to a predetermined range of positive temperature values. Although this range may vary depending, for example, on the particular engines 100 and aircraft installation, in the depicted embodiment the predetermined range is from 0 to 50° C.

As noted above, if the output of the comparator logic 212 is a logical "1" value, the limiter logic 218 receives the dynamically compensated inter turbine temperature value 228. The limiter logic 218 functions to limit the dynamically compensated inter turbine temperature value 228 to a value within a predetermined range of values. More specifically, the dynamically compensated inter turbine temperature value 228 is not limited unless it is more positive or more negative than the maximum positive or maximum negative values, respectively. If, however, the dynamically compensated inter turbine temperature value 228 is more positive or more negative than the maximum positive or maximum negative values, respectively, the limiter logic 218 will set the dynamically compensated inter turbine temperature value 228 equal to the maximum positive or maximum negative value, respectively. The predetermined maximum positive and maximum negative values are also set based upon testing and, as with the static compensation value 206, may vary, for example, with particular engines 100 and aircraft installations. In the depicted embodiment, however, the maximum positive and maximum negative values are selectable to values between −50° C. and +50° C., and are set to default to values of −30° C. and +30° C. No matter the specific values that are used, the limiter logic 218 supplies a magnitude-limited dynamically compensated inter turbine temperature value 234 to the second addition logic 222.

The second addition logic 222 receives the magnitude-limited dynamically compensated inter turbine temperature value 234 and the static compensation value 206, and supplies a non-rate-limited temperature compensation value 208' that is representative of the mathematical summation of the two values. The non-rate-limited temperature compensation value 208' is supplied to the rate limiter logic.224, depending upon whether the event determination logic 400 has determined that one or more predefined events are presently occurring. More specifically, if the event determination logic 400 not determines that no predefined events are presently occurring, then the non-rate-limited temperature compensation value 208' is supplied to the rate limiter logic 224. Conversely, if the event determination logic 400 determines that one or more predefined events are presently occurring, then the non-rate-limited temperature compensation value 208' is not supplied to the rate limiter logic 224. The event determination logic 400, the predefined events, and the functionality implemented by the event determination logic 400 are described in more detail further below.

The rate limiter logic 224 receives either the non-rate-limited temperature compensation value 208', the previously determined temperature compensation value 208, or a zero value, and functions to limit the rate of change of the received value to predetermined positive and negative rate values. The particular value that the rate limiter logic 224 receives depends upon whether the event determination logic 400 has determined that one or more predefined events is presently occurring. If, as noted above, the event determination logic 400 determines that no predefined events are presently occurring, then the rate limiter logic 224 will limit the rate of change of the non-rate-limited temperature compensation value 208' and supply the temperature compensation value 208.

Conversely, if the event determination logic 400 determines that one or more of the predefined events are presently occurring, then the rate limiter logic 224 will receive either the previously determined temperature compensation value 208, via a feedback loop 236, or a zero value. As will be described in more detail further below, the particular one of these two values will depend on the particular predefined event that is presently occurring. Nonetheless, the rate limiter logic 224 will supply these constant values as the temperature compensation value 208. It will be appreciated that if the zero value is supplied to the rate limiter logic 224 the rate of change from the previously determined temperature compensation value 208 to zero will be limited.

Before proceeding further, it is noted that the predetermined rate values implemented by the rate limiter logic 224 are also set based upon testing and, as described above, may vary, for example, with particular engines 100 and aircraft installations. In the depicted embodiment, the predetermined rate values are selectable to any desired range, and are set to default to −1° C./second and +1° C./second. No matter the specific values that are used, the rate limiter logic 224 supplies the temperature compensation value 208 to the temperature compensation logic 300.

The temperature compensation logic 300, which is illustrated in FIG. 3, receives the temperature compensation value 208 from the temperature compensation determination logic 200, and the signal representative of the local engine inter turbine temperature value 202. The temperature compensation logic 300 adds the temperature compensation value 208 to the local inter turbine temperature value 202, and supplies a signal representative of a compensated inter turbine temperature value (ITT_COMP_DISPLAY) 302 for display on the inter turbine temperature display 152. The temperature compensation logic 300 additionally reduces the temperature compensation value 208 if the compensated inter turbine temperature value 302 exceeds a predetermined threshold value 304.

To implement the above-described functionality, the temperature compensation logic 300 includes first, second, and third addition logic 303, 306, and 308, respectively, first, second, and third subtraction logic 312, 314, and 316, respectively, limiter logic 318, division logic 322, and multiplication logic 324. The first addition logic 303 receives the local engine inter turbine temperature value 202 and the temperature compensation value 208 and supplies a non-limited compensated temperature value 326 representative of the mathematical summation of the two values to the second subtraction logic 314.

The first subtraction logic 312 receives a predetermined maximum inter turbine temperature value (REDLINE) 328 and a washout value (REDLINE_WASHOUT) 332, and supplies the predetermined threshold value 304, which is representative of the mathematical difference of the two values to the second subtraction logic 314. The predetermined maximum inter turbine temperature value 328 is, as the term connotes, the maximum allowable inter turbine temperature that the local engine 100 may attain and be kept operating. It will be appreciated that the specific maximum temperature value may vary depending, for example, on the particular engine 100 being used. The predetermined maximum inter turbine temperature value 328 is preferably stored in non-illustrated memory, such as non-volatile memory, and is available for retrieval therefrom by the temperature compensation logic 300.

The washout value 332 is a temperature value that is used to set the predetermined threshold value 304. The predetermined threshold value 304 is a temperature value representative of a predetermined number of degrees below the predetermined maximum inter turbine temperature value 328 at which the temperature compensation logic 300 begins reducing the temperature compensation value 208. The washout value 332 is set during testing, may range over any one of numerous desired value ranges, and may default to any one of numerous values within the value range. In the depicted embodiment, however, the washout value 332 may be set within the range of 0 to 50° C., and defaults to 10° C. The washout value 332 is also preferably stored in non-illustrated memory, such as non-volatile memory, and is available for retrieval therefrom by the temperature compensation logic 300.

As noted above, the non-limited compensated temperature value 326 and the predetermined threshold value 304 are both supplied to the second subtraction logic 314. The second subtraction logic 314 supplies a difference value 336 representative of the mathematical difference of the two values to the limiter logic 318. The limiter logic 318, similar to the limiter logic 218 previously described, functions to limit the difference value 336 to a value within a predetermined range of values and supplies a magnitude-limited difference value 338. More specifically, the difference value 336 is not limited unless it is more positive than a maximum positive value 342 or is less than zero. If, however, the difference value 336 is more positive than a maximum positive value 342 or is less than zero, then the limiter logic 318 will set the magnitude-limited difference value 338 equal to the maximum positive value 342 or zero, respectively. The maximum positive value 342 is supplied from the second addition logic 306, and is the mathematical summation of the temperature compensation value 208 and the washout value 332.

The magnitude-limited difference value 338 is supplied to the division logic 322, which also receives the maximum positive value 342. The division logic 322 uses the magnitude-limited difference value 338 as a quotient numerator and the maximum positive value 342 as a quotient denominator, and supplies a quotient value 344 that is representative of the mathematical quotient of the two values to the multiplication logic 324. The multiplication logic 324 receives the quotient value 344 and the temperature compensation value 208, and supplies a product value 346 representative of the mathematical product of the two values to the third subtraction logic 316.

The third subtraction logic 316 receives the product value 346 and the temperature compensation value 208, and supplies a reduced temperature compensation value 348 representative of the mathematical difference of the two values. The reduced temperature compensation value 348, along with the local engine inter turbine temperature value 202, is supplied to the third addition logic 308. The third addition logic 308, in response, supplies the compensated inter turbine temperature value 302, which is representative of the mathematical summation of the two values, for display on the inter turbine temperature display 152.

From the previous description, it is seen that the reduced temperature compensation value 348, depending on the value of the non-limited compensated temperature value 326, will either be equal to the temperature compensation value 208 supplied from the temperature compensation determination logic 200, or some fraction thereof. As a result, the compensated temperature value 302 will either be equal to the non-limited compensated temperature value 326, or to a value less than the non-limited compensated temperature value 326. More specifically, if the non-limited compensated temperature value 326 is either equal to or less than the predetermined threshold value 304, then the temperature compensation value 208 will not be reduced and the compensated temperature value 302 will be equal to the non-limited compensated temperature value 326. Conversely, if the non-limited compensated temperature value 326 is greater than the predetermined threshold value 304, then the temperature compensation value 208 will be reduced and the compensated temperature value 302 will be less than the non-limited compensated temperature value 326.

The above-described functionality of the temperature compensation logic 300 causes magnitude of the temperature compensation value 208 to begin being reduced linearly once the local engine inter turbine temperature value 202 reaches the predetermined threshold value 304. This functionality ultimately causes the temperature compensation value 208 to be reduced to zero when the local engine inter turbine temperature value 202 reaches the predetermined maximum inter turbine temperature value 328.

As was previously noted, if one or more predefined events are occurring, the temperature compensation value 208 may be held constant at the previously determined value, or it may be set to a zero value. As was also previously noted, the event determination logic 400 functions to determine whether one or more of the predefined events is occurring. The event determination logic 400 is depicted in FIG. 4, and with reference thereto, will now be described in more detail.

The event determination logic 400 includes first, second, third, and fourth OR logic 402, 404, 406, and 408, respectively, first and second comparator logic 412 and 414, respectively, and first and second subtraction logic 416 and 418, respectively. The first OR logic 402 receives logic values from the second OR logic 404, the first comparator logic 412, and the second comparator logic 414. If the logic values supplied from any of these logics is a logical "1" value, then the logic value (HOLD) 422 supplied from the first OR logic 402 to the temperature compensation value determination logic 200 will be a logical "1" value. Conversely, if all of the logic values supplied from these logics is a logical "0" value, then HOLD 422 will also be a logical "0" value. As was noted above, and with quick reference to FIG. 2, if HOLD 422 is a logical "1" value, the previously determined temperature compensation value 208 is fed back to the input of rate limiter logic 224. As a result, the temperature compensation value 208 is held constant.

Returning once again to FIG. 4, it is seen that the logic value 424 of the first comparator logic 412 will be a logical "1" value if the PLAs differ by a predetermined magnitude, and the logic value 426 of the second comparator 414 will be a logical "1" value if the local and cross-engine fan speeds (N1s), either actual or displayed, differ by a predetermined magnitude. The first comparator logic 412 receives a PLA difference magnitude value 432 representative of the absolute value of the difference between the local engine PLA (PLA) 434 and the cross-engine PLA (PLA_XE) 436. The PLA difference magnitude value 432 is supplied by the first subtraction logic 416, which receives the local engine PLA (PLA) value 434 and the cross-engine PLA (PLA_XE) value 436, and determines the absolute magnitude of the mathematical difference of the two values. The first comparator logic 412 compares the PLA difference magnitude value 432 to a predetermined PLA difference threshold value (PLA_DIFF_THRESH) 438. If the PLA difference magnitude value 432 exceeds the predetermined difference threshold value 438 then the logic value 424 is a logical "1" value, otherwise it is a logical "0" value. It will be appreciated that the predetermined difference threshold value 438 may vary, but in the depicted embodiment the value 438 is stored in memory and is selectable from a range of values between 0-degrees and 20-degrees, with a default value of 5-degrees.

The second comparator logic 414 receives a N1 difference magnitude value 442 representative of the absolute value of the difference between the local engine N1 (N1) 444 and the cross-engine N1 (N1_XE) 446. The N1 difference magnitude value 442 is supplied by the second subtraction logic 418, which receives the local engine N1 (N1) value 444 and the cross-engine N1 (N1_XE) value 446, and determines the absolute magnitude of the mathematical difference of the two values. The second comparator logic 414 compares the N1 difference magnitude value 442 to a predetermined N1 difference threshold value (N1_DIFF_THRESH) 448. If the N1 difference magnitude value 442 exceeds the predetermined difference threshold value 448 then the logic value 426 is a logical "1" value, otherwise it is a logical "0" value. It will be appreciated that the predetermined difference threshold value 448 may vary, but in the depicted embodiment the value 448 is stored in memory and is selectable from a range of values between 0 and 420 rpm, with a default value of 100 rpm.

The logic value 428 supplied from the second OR logic 404 will be a logical "1" value if logic signals supplied thereto indicate that either the local engine or cross-engine is in APR (Auxiliary Power Rating) active mode (APR_ENABLE, APR_ENABLE_XE) 452, 454 (an elevated power rating which may be safely used for a limited time during limited circumstances), either the local engine or cross-engine is in manual mode (MANUAL_MODE, MANUAL_MODE_XE) 456, 458, the cross-engine is shutdown (ENG_OUT_XE) 462, the cross-engine inter turbine temperature sensor 142 is invalid (ITT_VALID_XE) 464, or a digital data link from the cross-engine has failed (FAULT_163) 463.

The fourth logic OR 408 receives a logic value 465 from the third OR logic 406, and a logic value 466 representative of the local engine being shutdown (ENG_OUT). If either of these logic values 465, 466 is a logical "1" value, then the logic value (ZERO) 468 supplied from the fourth OR logic 408 to the temperature compensation value determination logic 200 will be a logical "1" value. Conversely, if all of the logic values supplied from these logics is a logical "0" value then the logic value (ZERO) 468 will also be a logical "0" value.

With quick reference once again to FIG. 2, it was previously noted that if ZERO 468 is a logical "1" value, the temperature compensation value 208 set to a value of zero. It is additionally noted that if the temperature compensation value 208 is a non-zero value when ZERO 468 becomes a logical "1" value, the rate limiter logic 224 will limit the rate at which the compensation value 208 is ramped to zero.

Returning once again to FIG. 4, it is seen that the logic value 465 from the third OR logic 406 is a logical "1" value if logic signals (FAULT_23, FAULT_24, FAULT_25, FAULT_26) 472-478 supplied thereto indicate that the local engine inter turbine temperature sensor 142 is not valid. These logic signals 472-478 will be a logical "1" value if, for example, the local engine inter turbine temperature sensor 142 is inaccurate, out of range, open, shorted, or any one of numerous other potential faults. Although four logic values 472-478 are shown as being supplied to the third OR logic 406, it will be appreciated that more or less than this number of logic values could be provided, as needed or desired.

The display control logic 160 illustrated in FIGS. 2-4 and described above is merely exemplary of a particular preferred embodiment. It will be appreciated, however, that the display control logic 160 could be implemented using various configurations and/or logic schemes to implement the overall inter turbine temperature compensation methodology described herein. For example, the temperature compensation value logic 200 could be implemented without the rate limiter logic 224, and instead rate limiting logic could be implemented in the temperature compensation logic 300. Additionally, the display control logic 160 could be implemented such that the compensation value 208 will be held to the previously determined value only if the PLAs differ by a predetermined magnitude or the N1s differ by a predetermined magnitude. Moreover, the display control logic 160 could be implemented such that the compensation value 208 is set to zero if the local engine or cross-engine is in APR active mode, either the local engine or cross-engine is in manual mode, the cross-engine is shutdown, the cross-engine inter turbine temperature sensor 142 is invalid, a digital data link from the cross-engine has failed, or the local engine inter turbine temperature sensor 142 is not valid. These are also merely exemplary alternatives of any one of numerous other alternatives.

Figure 5:
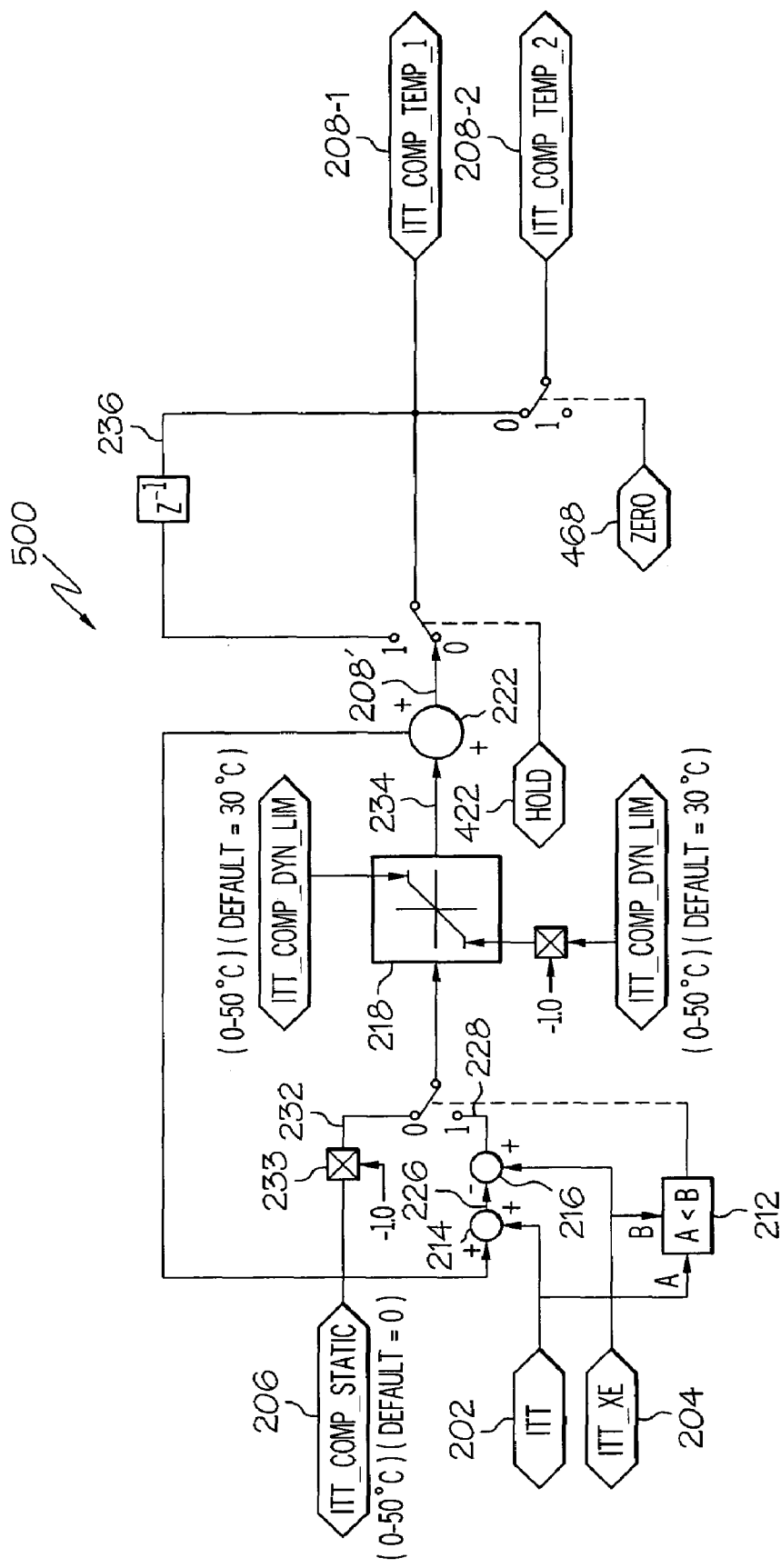
FIGS. 5-7 are simplified functional block diagrams of an embodiment of inter turbine temperature display control logic according to an alternate embodiment of the present invention.
Figure 6:
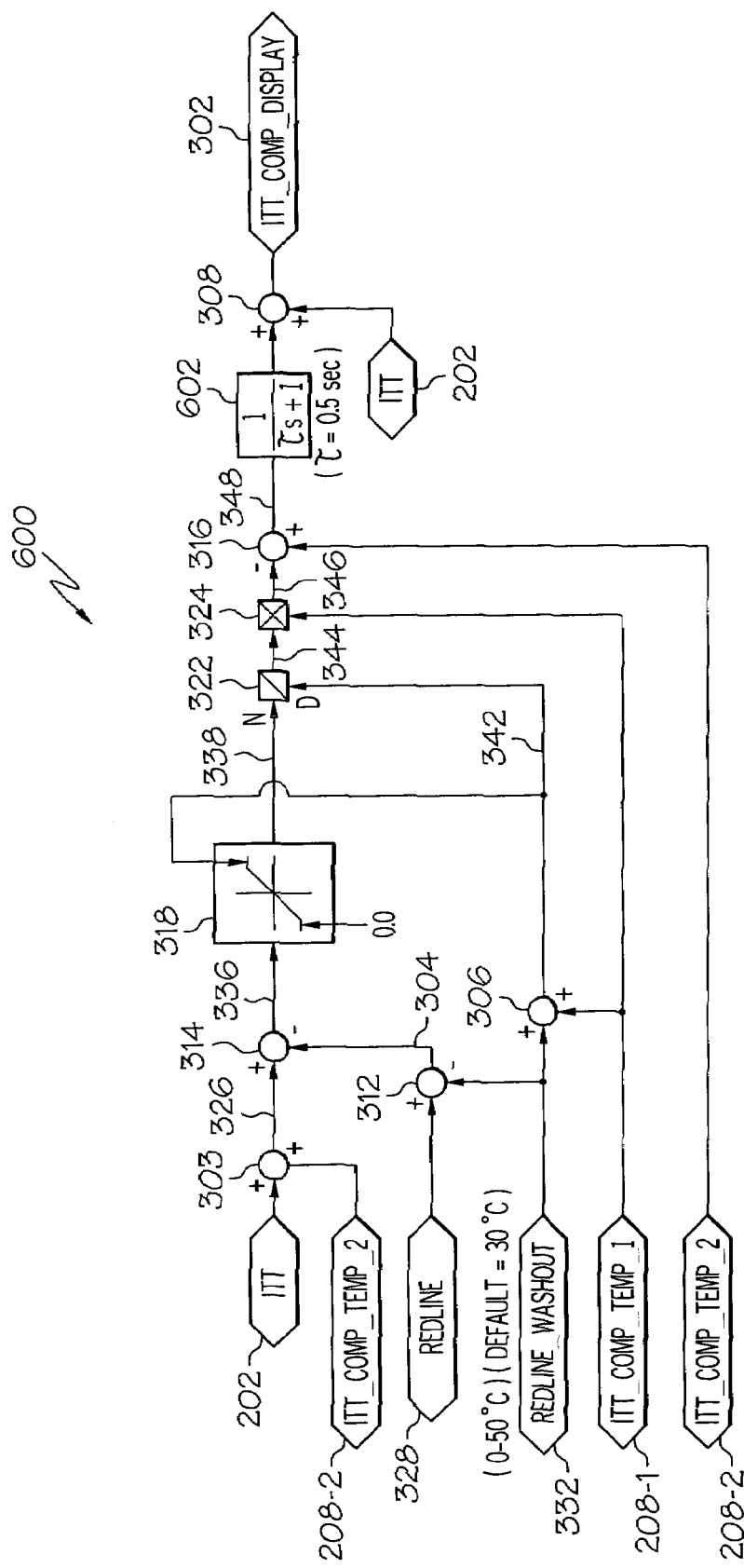
Figure 7:
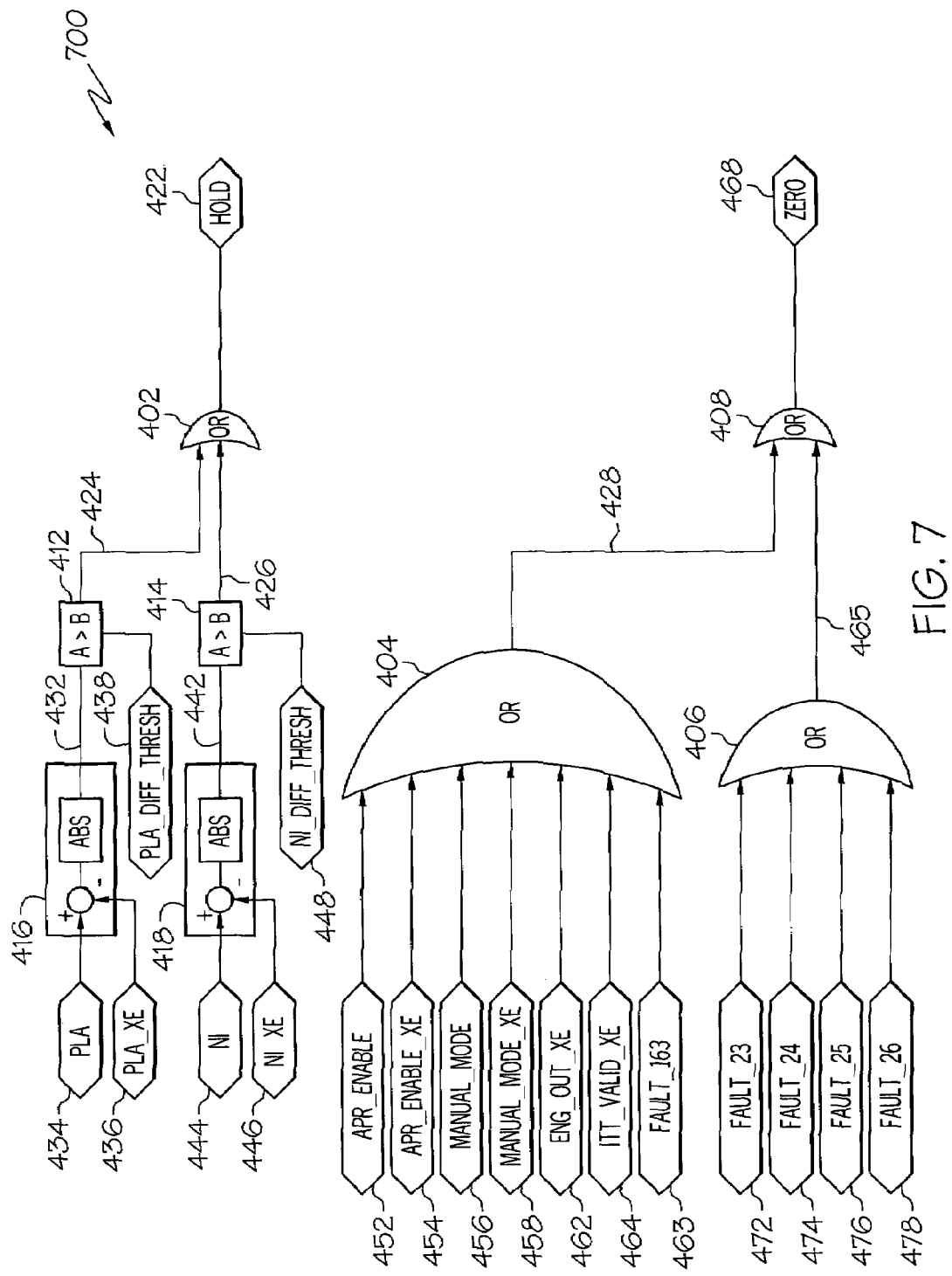

An alternative embodiment of the display control logic 160 that implements the alternative functions described above is shown in FIGS. 5-7, which illustrate embodiments of alternate compensation value determination logic 500 (FIG. 5), alternate temperature compensation logic 600 (FIG. 6), and alternate event determination logic 700 (FIG. 7). It is noted that like reference numerals in FIGS. 2-4 and FIGS. 5-7 refer to like logic elements. As such, like logic elements will not be further described herein. Moreover, the operation of the alternative control logic 160 illustrated in FIGS. 5-7 is, in most aspects, substantially identical to that illustrated in FIGS. 2-4, and where it is not, its functionality is readily discernable to the skilled artisan. Therefore, it will also not be described in detail. One of the differences in the two exemplary embodiments is that rate limiting logic 602 is implemented in the alternate temperature compensation logic 600 rather than in the alternate compensation value determination logic 500. The other difference, as is seen in FIG. 7, is that the predefined events that cause the temperature compensation value to be held to the previously determined value or to be zeroed differ from the previous embodiment.

The control logic and method described herein compensates mismatched inter turbine temperatures between two gas turbine engines. As a result, any potential nuisance or distraction that the flight crew may experience from displaying the mismatch is eliminated.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method of compensating mismatched inter turbine temperature of two gas turbine engines for subsequent display thereof, the two gas turbine engines including a local engine and a cross-engine, the method comprising the steps of:

sensing the inter turbine temperature of each gas turbine engine and supplying sensed inter turbine temperature values representative thereof;

determining which gas turbine engine has a lower sensed inter turbine temperature value and which has a higher sensed inter turbine temperature value;

adding a temperature compensation value to the lower sensed inter turbine temperature value to thereby increase the lower sensed inter turbine temperature value to a compensated inter turbine temperature value that is substantially equal to the higher sensed inter turbine temperature value.

2. The method of claim 1, further comprising:

reducing the temperature compensation value that is added to the lower sensed inter turbine temperature value if the compensated inter turbine temperature value is at least a first predetermined threshold value.

3. The method of claim 2, wherein the first predetermined threshold value is representative of a predetermined number of degrees below a predetermined maximum inter turbine temperature.

4. The method of claim 3, wherein the step of reducing the temperature compensation value comprises the steps of:
subtracting the predetermined threshold value from the compensated inter turbine temperature value to obtain a difference value;
adding the predetermined number of degrees to the temperature compensation value to obtain a sum value;
dividing the difference value by the sum value to obtain a quotient value;
multiplying the temperature compensation value by the quotient value to obtain a product value; and
subtracting the product value from the temperature compensation value to obtain a reduced temperature compensation value.

5. The method of claim 1, further comprising:
determining the temperature compensation value based at least in part on the sensed inter turbine temperature values; and
limiting the rate of change of the determined temperature compensation value to a predetermined rate value.

6. The method of claim 5, wherein the step of determining the temperature compensation value comprises the steps of:
adding a predetermined static compensation value to the lower sensed inter turbine temperature value to thereby obtain a statically compensated inter turbine temperature value;
subtracting the statically compensated inter turbine temperature value from the higher sensed inter turbine temperature value to thereby obtain a dynamically compensated inter turbine temperature value;
adding the predetermined static compensation value to the dynamically compensated inter turbine temperature value to thereby obtain the temperature compensation value.

7. The method of claim 6, wherein the dynamically compensated inter turbine temperature value is limited to a predetermined range of temperature values.

8. The method of claim 1, wherein the inter turbine temperatures are sensed via inter turbine temperature sensors, and wherein the method further comprises the steps of:
reducing the temperature compensation value to zero if one or more of the inter turbine temperature sensors is determined to be faulty.

9. The method of claim 1, further comprising:
determining if a predefined event occurs; and
upon occurrence of the predefined event, maintaining the temperature compensation value substantially constant until the predefined event is no longer occurring.

10. The method of claim 9, wherein the predefined event includes a predetermined difference between the throttle commands supplied to the two gas turbine engines.

11. The method of claim 9, wherein the predefined event includes a predetermined difference between rotational speeds of the two gas turbine engines.

12. The method of claim 9, wherein the predefined event includes the cross-engine being configured to operate in a manual mode.

13. The method of claim 9, wherein the predefined event includes the cross-engine being shutdown.

14. The method of claim 9, wherein the predefined event includes inability to sense the inter turbine temperature of the cross-engine.

15. The method of claim 9 wherein:
the two gas turbine engines may each be selectively operated in an auxiliary power rating active mode;
the auxiliary power rating active mode is a mode in which an elevated power rating may be utilized for a limited time; and
the predefined event includes one of the two gas turbine engines being configured to operate in the auxiliary power rating mode.

16. The method of claim 1, further comprising:
determining if a predefined event occurs; and
upon occurrence of the predefined event, zeroing the temperature compensation value until the predefined event is no longer occurring.

17. The method of claim 16, wherein the temperature compensation value is zeroed at a predetermined rate.

18. The method of claim 16, wherein the predefined event includes the local engine being shutdown.

19. The method of claim 16, wherein the predefined event includes inability to sense the inter turbine temperature of the local engine.

* * * * *